United States Patent [19]
Kuroda

[11] Patent Number: 5,339,167
[45] Date of Patent: Aug. 16, 1994

[54] REPRODUCTION SPEED CONTROLLER FOR IMAGE SIGNAL REPRODUCING APPARATUS

[75] Inventor: Kazuo Kuroda, Tokorozawa, Japan

[73] Assignee: Pioneer Electronic Corporation, Tokyo, Japan

[21] Appl. No.: 992,529

[22] Filed: Dec. 17, 1992

[30] Foreign Application Priority Data

Dec. 26, 1991 [JP] Japan .................. 3-344811

[51] Int. Cl.$^5$ .............................. H04N 5/95
[52] U.S. Cl. .................. 358/339; 358/335; 358/312; 360/10.1
[58] Field of Search .......... 360/10.1, 11.1, 38.1; 358/312, 313, 342, 314, 310, 335, 339

[56] References Cited

U.S. PATENT DOCUMENTS

| | | | |
|---|---|---|---|
| 4,630,132 | 12/1986 | Terada | 358/310 |
| 4,774,599 | 9/1988 | Baumeister | 360/11.1 |
| 4,864,428 | 9/1989 | Kanamaru | 358/342 |
| 4,959,825 | 9/1990 | Okano | 358/339 |
| 5,285,288 | 2/1994 | Takahashi et al. | 358/339 |

Primary Examiner—Alvin E. Oberley
Assistant Examiner—Vivian W. Chang
Attorney, Agent, or Firm—Kane, Dalsimer, Sullivan, Kurucz, Levy, Eisele and Richard

[57] ABSTRACT

A reproduction speed controller for controlling reproduction speed of a video signal having first field image signal and second field image signal including main memory having a storage capacity of two field image signal, sub memory having a storage capacity of at least one field image signal, write unit for writing an input video signal into the main memory and the sub memory in synchronism with a write reference signal which corresponds to a frequency of the input video signal, read unit for selectively read out the written video signal from the main memory and the sub memory in synchronism with a read reference signal having a fixed frequency, passing detection unit for generating a passing detection signal on the basis of the frequency difference between the write reference signal and the read reference signal when the frequency of the write reference signal is lower than the frequency of the read reference signal, and control unit for controlling the write unit and the read unit in response to the passing detection signal, wherein the control unit permits the read unit to successively read out the first field image signal twice and subsequently permits the read unit to successively read out the second field image.

9 Claims, 14 Drawing Sheets

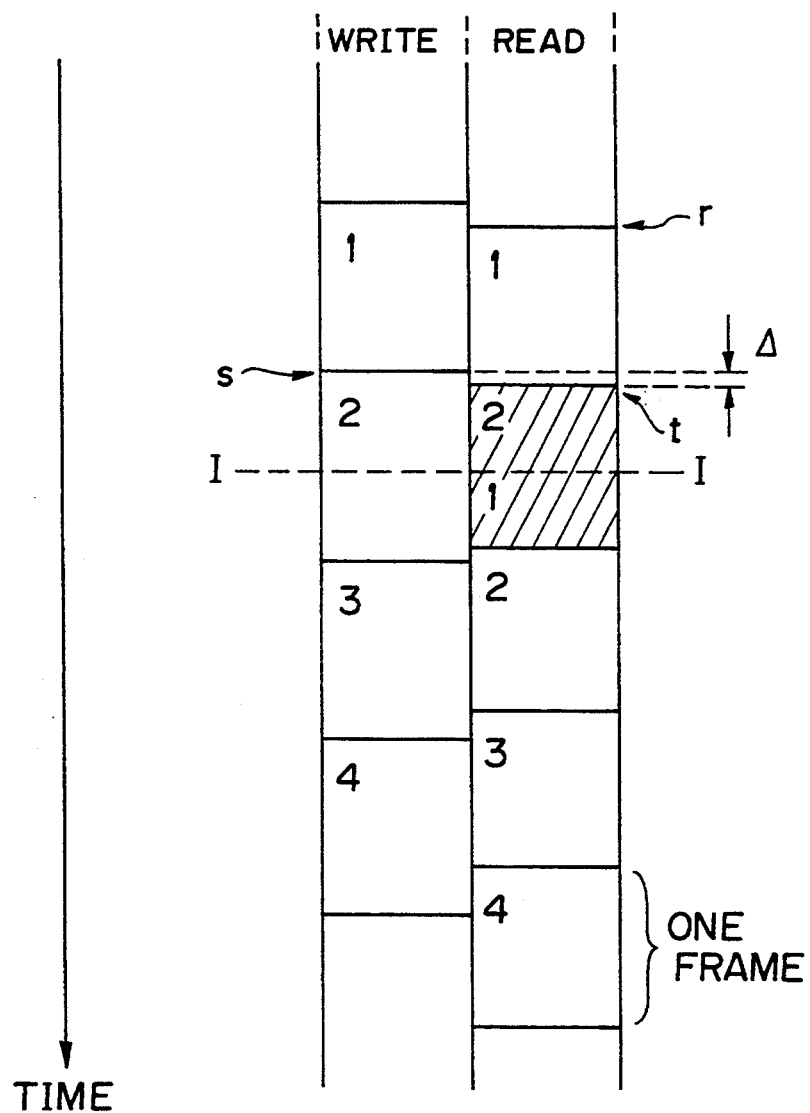

REPRODUCTION SPEED CONTROLLER FOR IMAGE SIGNAL REPRODUCING APPARATUS

BACKGROUND OF THE INVENTION

1. Field of the Invention

This invention relates to a reproduction speed controller for an image signal reproducing apparatus which reproduces video image signal or the like from an information recording medium such as a laser video disk (LVD) or a video tape (VT), and more particularly to a reproduction speed controller capable of reproducing image signal having relatively low frequency without deterioration.

2. Description of the Prior Art

There is known a musical accompaniment playing apparatus which reproduces musical accompaniment from a recording medium such as an Laser Video Disc (LVD) or the like. This apparatus displays images relating to a musical accompaniment and lyrics thereof in synchronism with the musical accompaniment. In the recording medium, images are recorded in the form of a plurality of frame images. One frame image is comprised of two field images, a first field image and a second field image. Each of the field images are displayed for 1/60 sec., and these field images are recognized as a single image by the after-image effect of the eye of the human being.

It is known that some types of musical accompaniment playing apparatuses have a so-called key control function for controlling musical interval, by adjusting a reproduction speed of information part only relating to voice, to be comfortable for a singer who feels difficult to sing a song with an original musical interval (key).

However, the musical accompaniment playing apparatus does not have a function for adjusting the reproduction speed of images displayed in synchronism with the musical accompaniment. In the above apparatus, when the reproduction speed of the image are high, one frame image is omitted from every predetermined number of frame images in accordance with the reproduction speed. On the other hand, when the reproduction speed of the images are low, one frame image is inserted to every predetermined number of frame images in accordance with the reproduction speed. In the former case, there is particularly no problem. In contrast, in the latter case, the following problem occurs.

Namely, if the frame image $F_5$ is inserted after the same frame image $F_5$ as shown in FIG. 1, field images are displayed in the order of the ninth field $f_9$, the tenth field $f_{10}$, the ninth field $f_9$, and the tenth field $f_{10}$. Accordingly, when the image shifts from the tenth field $f_{10}$ to the ninth field $f_9$, the order is reversed, which results in a momentary retrogression of images in time. This appears on a picture as a fluctuation of the image. Since such a fluctuation appears every predetermined number of frame images, it is extremely conspicuous.

In order to prevent such inconvenience, it is conceivable to synthesize the field images at a predetermined rate to form a new field image. Further, it is conceivable to use a device which is capable of producing a new frame image from the successive frames such as frame images $F_5$ and $F_6$ in FIG. 1. However, such a device is very expensive and, makes the outline of the image unclear.

SUMMARY OF THE INVENTION

It is an object of this invention is to provide a reproduction speed controller for a video signal reproducing apparatus capable of reproducing video image having relatively low frequency without deterioration.

According to one aspect of the present invention, there is provided a reproduction speed controller for controlling reproduction speed of a video signal having first field image signal and second field image signal, including main memory having a storage capacity of two field image signal, sub memory having a storage capacity of at least one field image signal, write unit for writing an input video signal into the main memory and the sub memory in synchronism with a write reference signal which corresponds to a frequency of the input video signal, read unit for selectively read out the written video signal from the main memory and the sub memory in synchronism with a read reference signal having a fixed frequency, passing detection unit for generating a passing detection signal on the basis of the frequency difference between the write reference signal and the read reference signal when the frequency of the write reference signal is lower than the frequency of the read reference signal, and control unit for controlling the write unit and the read unit in response to the passing detection signal, wherein the control unit permits the read unit to successively read out the first field image signal twice and subsequently permits the read unit to successively read out the second field image.

According to the present invention thus constructed, when a speed control command for making the reproducing speed of image information slow is input, the write unit temporarily stores, into both of the memories, reproduced image signal at a time when the passing occurs. The passing occurs according to a difference between the speed of write reference signal and the read reference signal. Subsequently, the control unit carries out a control of reproducing image of the first field twice in succession. Then, the control unit carries out a control of reproducing image of the second field twice in succession. Accordingly, display of image at the time of passing is conducted in the order of the first field, the first field, the second field, and the second field of the insertion frame, resulting no reversal of field images in time. Thus, a picture easy to see and free from fluctuation is provided. Namely, this reproducing speed controller can advantageously control the reproducing speed of an image without deterioration of the reproduced image.

BRIEF DESCRIPTION OF THE DRAWINGS

FIGS. 12 to 14 are explanatory views showing the operation in the comparative example of the configuration of FIG. 11.

DESCRIPTION OF THE PREFERRED EMBODIMENTS

Preferred embodiments of the present invention will now be described with reference to the attached drawings.

First embodiment

Figure 1:
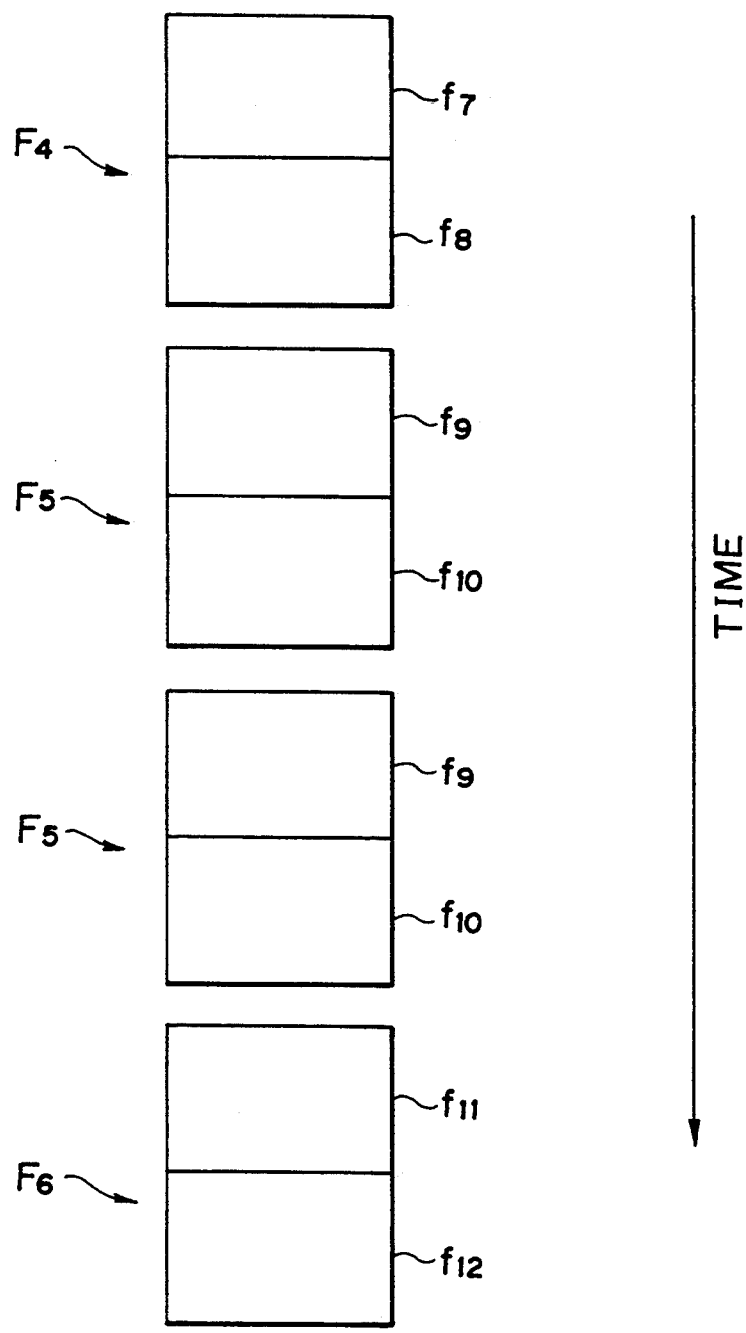
FIG. 1 is an explanatory views showing an image reproduction of an image information reproducing apparatus.
Figure 2:
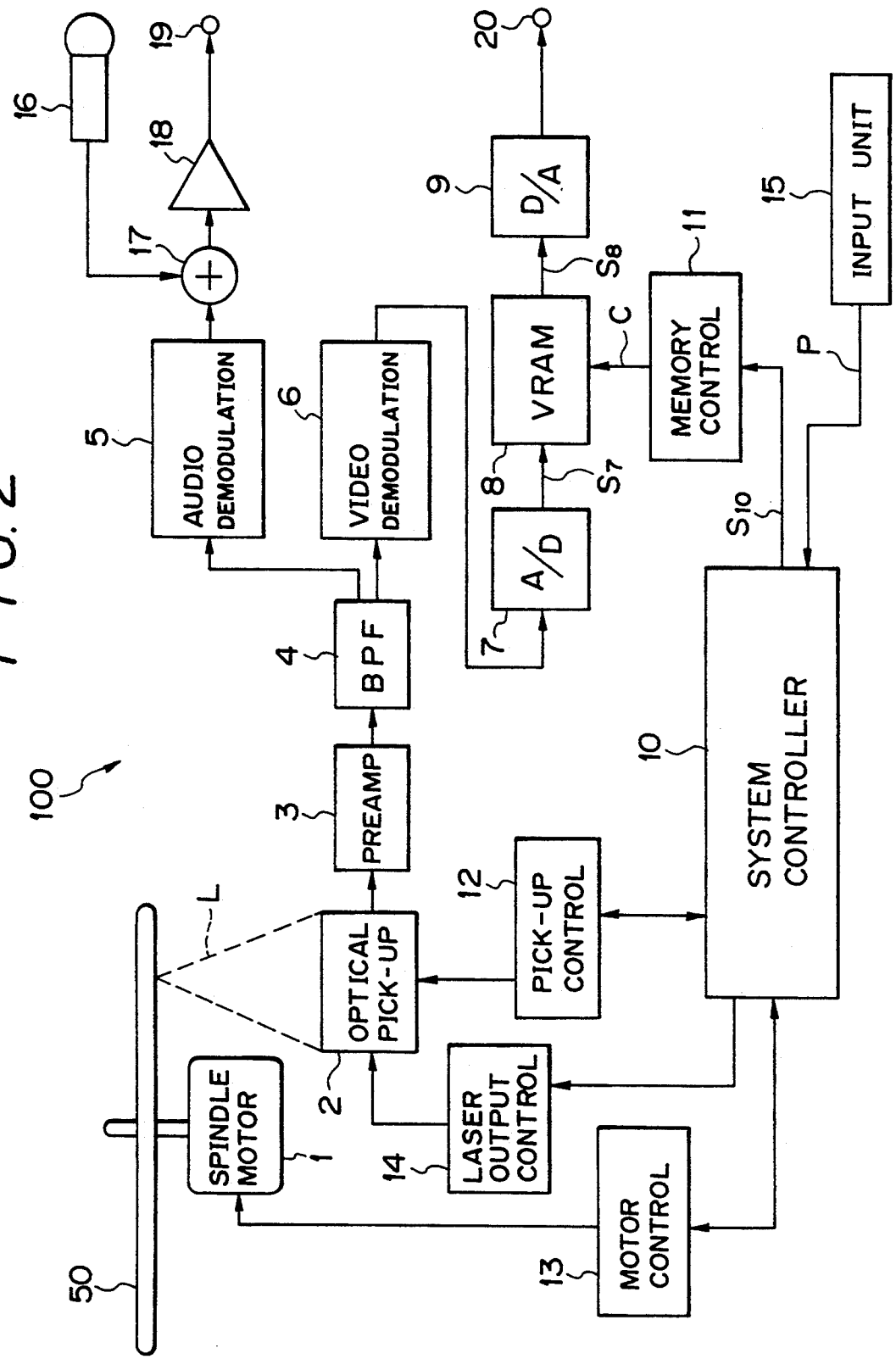
FIG. 2 is a block diagram showing a configuration of a first embodiment according to the present invention.
Figure 3:
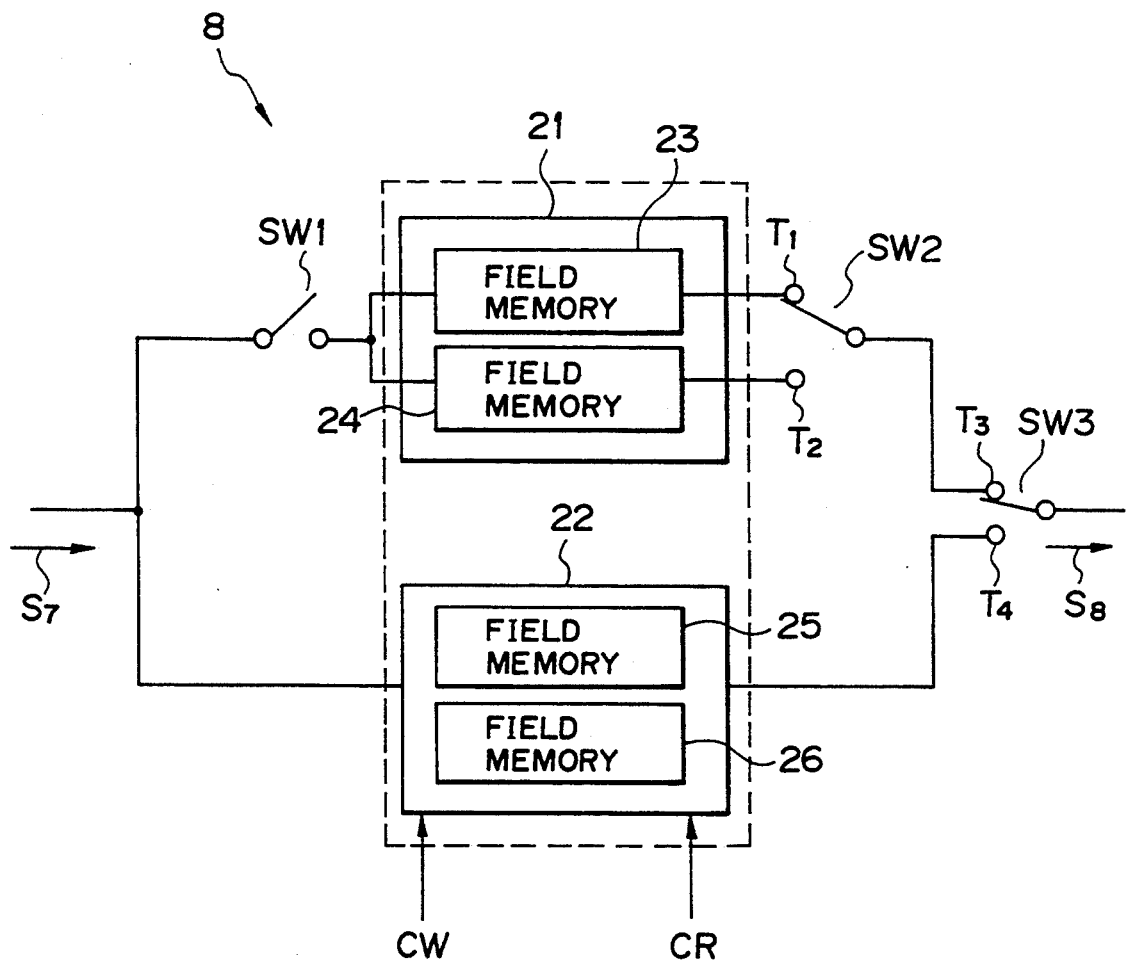
FIG. 3 is a diagram showing a detailed configuration of a VRAM according to the first embodiment of the present invention.

A first embodiment in which the present invention is applied to an LVD musical accompaniment playing apparatus is shown in FIGS. 2 and 3. In FIG. 2, the LVD musical accompaniment playing apparatus 100 includes a spindle motor 1 for rotationally driving a LVD disc 50 serving as an information recording medium, an optical pick-up 2 for irradiating a laser beam L onto the rotating LVD disk 50 to read out record information recorded on the LVD disk 50 and output it as a read signal, a pre-amplifier 3 for amplifying the read signal read out by the optical pick-up 2, a band-pass filter 4 for separating and extracting, from the amplified read signal, signal in a first frequency band including a frequency band of voice signal and a signal in a second frequency band including a frequency band of video signal, an audio demodulation unit 5 for demodulating audio signal from the extracted first frequency band signal, and a video demodulation unit 6 for demodulating video signal from the extracted second frequency band signal.

This LVD musical accompaniment playing apparatus 100 further includes a microphone 16 for transforming a voice sung in harmony with a played musical accompaniment to a voice signal, a mixer 17 connected to the voice demodulation unit 5 and adapted to mix the voice signal input via the microphone 16 with the demodulated voice signal of musical accompaniment, an amplifier 18 for amplifying the mixed signal, and a voice output terminal 19 for outputting the amplified mixed voice signal.

This LVD musical accompaniment playing apparatus still further includes an A/D converter 7 for converting the analog video signal demodulated at the video demodulation unit 6 to a digital video signal $S_7$, a VRAM 8 for temporarily storing the digital video signal $S_7$, a memory control unit 11 for controlling write/read operation of information of the VRAM 8, a D/A converter 9 for converting a digital video signal $S_8$ read out from the VRAM 8 to an analog video signal, and a video output terminal 20 for outputting the analog video signal.

Furthermore, the LVD musical accompaniment playing apparatus 100 includes a motor control unit 13 for controlling rotation of the spindle motor 1, a laser output control unit 14 for controlling an intensity of laser beam output from the optical pick-up 2, a pick-up control unit 12 for controlling the position and the focal point of the optical pick-up 2, and a system controller 10 for carrying out supervisory control of these respective control units and the memory control unit 11. In addition, the LVD musical accompaniment playing apparatus 100 includes an input unit 15 connected to the system controller 10 so that various control commands can be input therefrom.

Detailed configuration of the VRAM 8 of the first embodiment will now be described with reference to FIG. 3. As shown in FIG. 3, this VRAM 8 includes frame memories 21 and 22, and changeover switches $SW_1$, $SW_2$ and $SW_3$. The frame memory 21 includes a field memory 23 for storage of the first field and a field memory 24 for storage of the second field. Further, the frame memory 22 includes a field memory 25 for storage of the first field and a field memory 26 for storage of the second field. In addition, the changeover switch $SW_2$ includes switching terminals $T_1$ and $T_2$, and the changeover switch $SW_3$ includes switching terminals $T_3$ and $T_4$.

Figure 11:
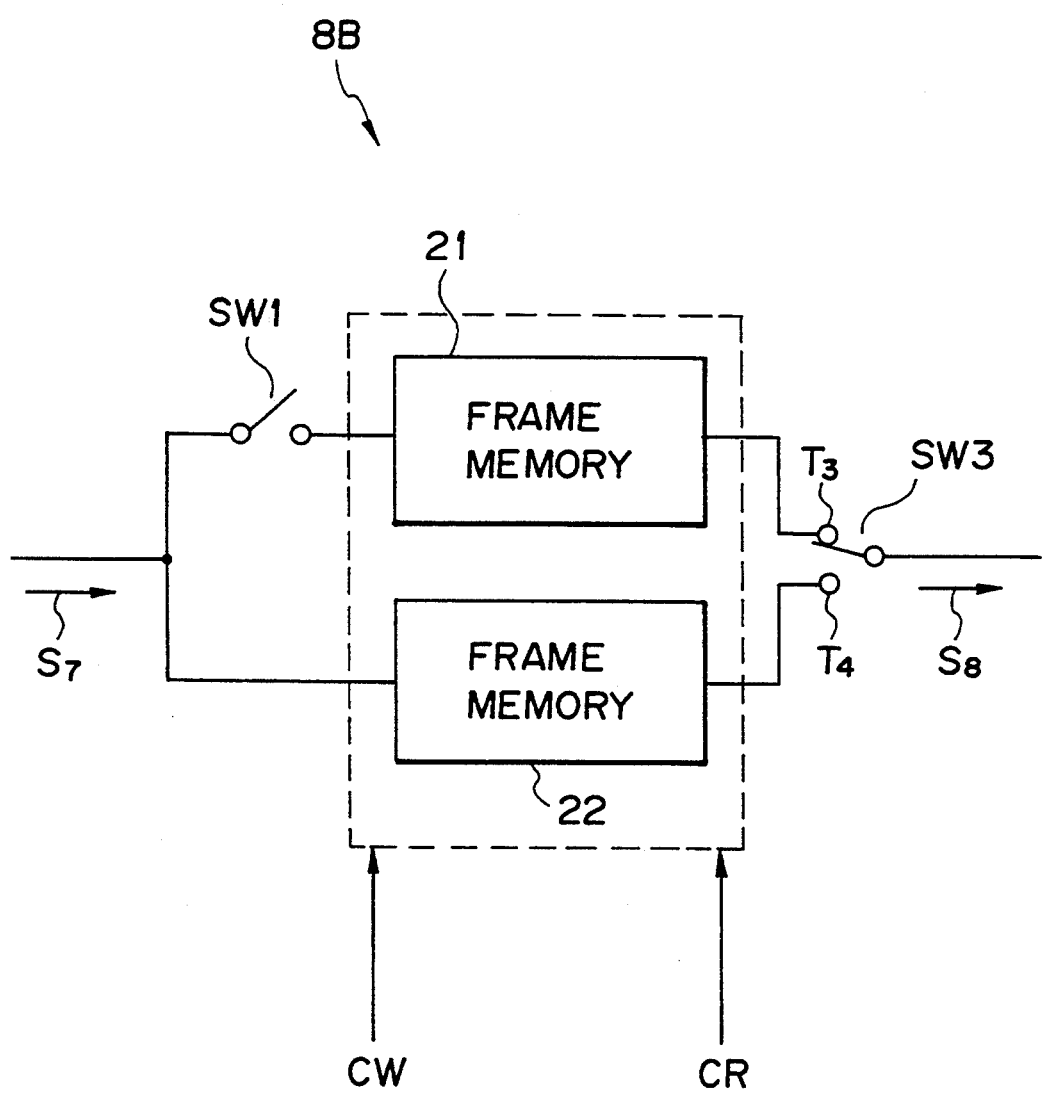
FIG. 11 is a diagram showing the configuration of a comparative example where a memory of one frame is used.

Prior to the description of the first embodiment of the present invention, explanation will be first given to a comparative example where only one frame memory is used with reference to FIGS. 11 to 14. In FIG. 11, VRAM 8B includes frame memories 21 and 22, and changeover switches $SW_1$ and $SW_3$. In this case, it is assumed that only frame memory 21 is used for storing the video signal. Accordingly, it is assumed that the changeover switch $SW_3$ is connected to the frame memory 21 side (terminal $T_3$ side) at any time.

In FIG. 11, a write control signal CW and a read-out control signal CR are supplied to respective frame memories 21 and 22. The write control signal CW includes a write clock, a write V.reset pulse and a write H.reset pulse. In addition, the read-out control signal CR includes a read clock, a read V.reset pulse and a read H.reset pulse.

The write clock is a signal synchronous with a burst sub-carrier of the reproduced digital video signal $S_7$, and has a frequency (4.fsc) which is four times greater than the sub-carrier frequency of the reproduced video signal (fsc). The read clock is a reference clock for reading, and has a frequency four times greater than the sub-carrier (3.58 MHz) of the standard NTSC signal. The read-out control signal is generated by a reference signal generator which is not shown.

The write V.reset pulse is a write reset pulse for the frame memory, produced from the digital video signal $S_7$, which resets the write address to zero. In this example, the write V.reset pulse resets the write address at the leading edge of $V._{SYNC}$ of the first field. The read V.reset pulse resets the read address to zero at the leading edge of $V._{SYNC}$ of the first field which is generated by the reference signal generator.

Figure 12:
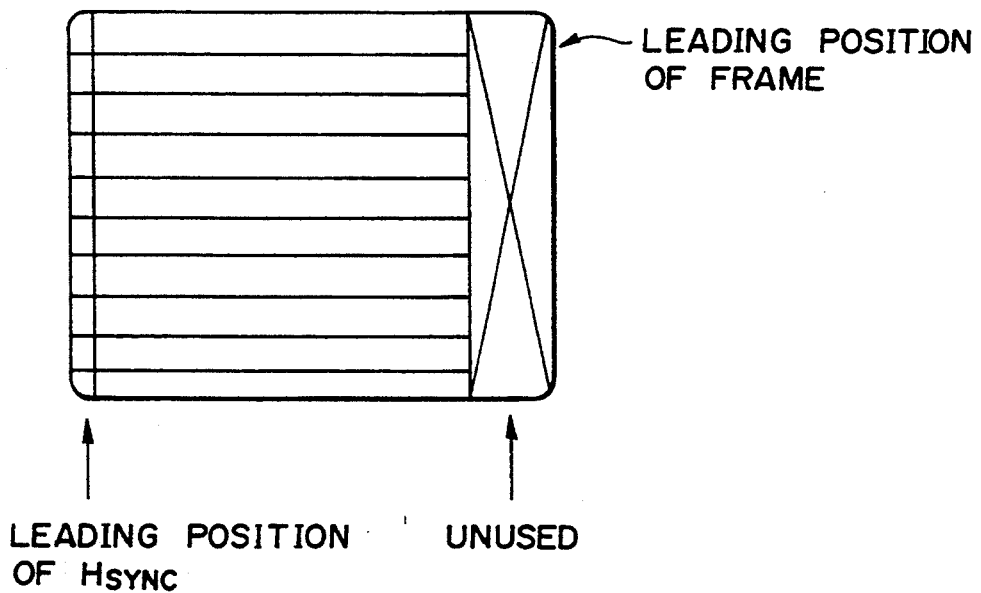

The write H.reset pulse, generated from the digital video signal $S_7$, is synchronous with the $H._{SYNC}$ of the reproduced video signal. The input video signal is written into the memory at the timing of the write H.reset pulse. Accordingly, the input video signal is regularly written into the memory as shown in FIG. 12. The read H.reset pulse is generated from the reference signal generator. The video signal written in the memory is read out at the timing of the read H.reset pulse from the corresponding position where the video signal is written. Some memories may not required to use an H.reset pulse. In that case, address increment will be automatically carried out.

In the following description, the fact that the changeover switch $SW_1$ is in an open state means that no data is written into the memory. In actual terms, the state where no data is written into the memory is realized by allowing the write enable signal WE to be in a disable state, or by stopping supply of the write clock. If the changeover switch $SW_1$ is actually opened, since the write enable signal WE is in an enable state and the write clock exists, disable data might be written into the memory.

Figure 13:
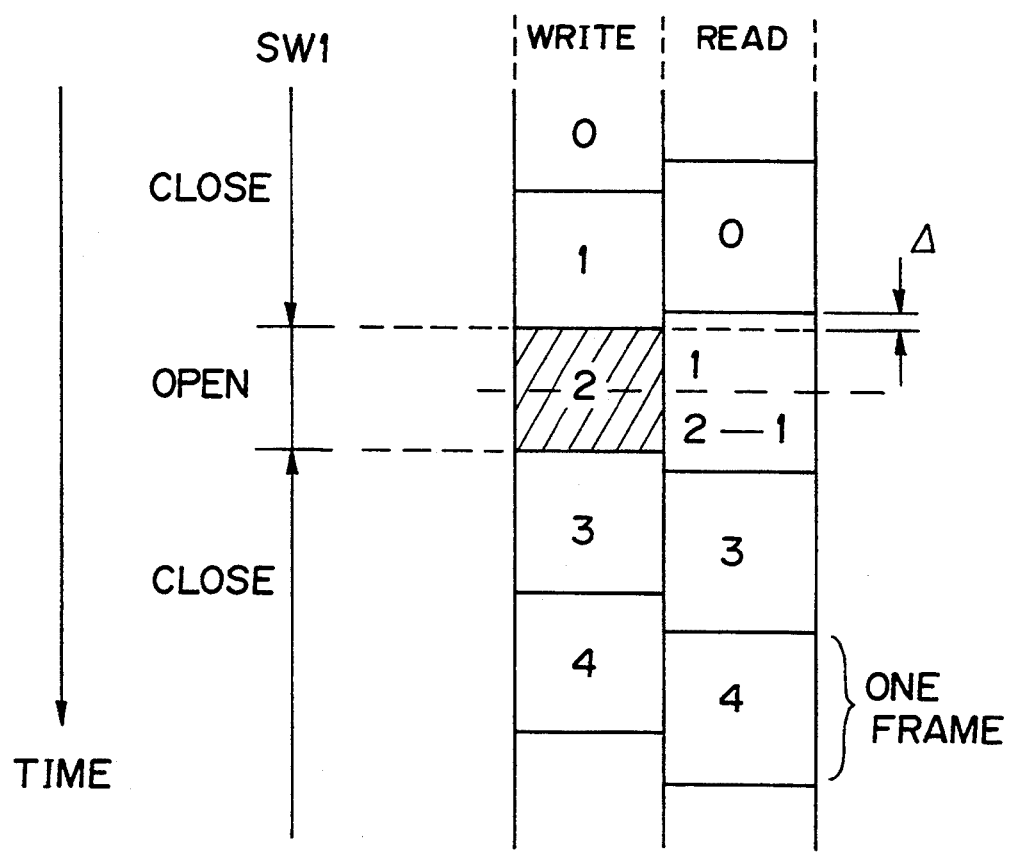

First, the case where one frame should be omitted will now be described with reference to FIG. 13. In FIG. 13, when the write reset pulse is faster than the read reset pulse by +10% ($\Delta$ is assumed to be equal to 26), if no measure is taken, a passing occurs at the intermediate portion of a certain frame. In this case, the "passing" means the phenomenon that the write reset pulse passes (outruns) the read reset pulse. In view of this, an approach is employed to count the H.reset pulse between the read V.reset pulse and the write V.reset pulse. If the count value is less than a predetermined value, i.e., when the interval is less than about 52H because the write clock is faster than the read pulse by +10% in this case, the changeover switch $SW_1$ is opened. Actually, the write enable signal WE is caused to be at high level to inhibit write operation. If no measure is taken, the upper half of the read-out signal (on the right side of the hatched portion 2 in FIG. 12) becomes an image of frame 1 while the lower half thereof becomes an image of frame 2. However, when the changeover switch $SW_1$ is opened (WE is caused to be at high level), the image of frame 1 is be read out for all of the read-out image.

Next, the case where one frame should be inserted will now be described with reference to FIG. 14. When the write reset pulse is 10% slower than the read reset pulse ($\Delta$ is assumed to equal to 26), the passing occurs at the intermediate portion of a certain frame (hatched portion of FIG. 14). In this case, the "passing" means the phenomenon that the read reset pulse passes the write reset pulse. The passing is detected by counting the number of H.reset pulse between the write V.reset pulse and the read V.reset pulse. If the count value becomes less than a predetermined value, the passing will take place in the next frame.

In this case, if no frame image is inserted, the image of frame 2 is output at the upper half and the image of frame 1 is output at the lower half as shown in the hatched portion of FIG. 14. If an image of frame 1 is output for all the image, there results no reversal or retrogression of image. To realize this, it is sufficient to insert a picture of the frame 1 at the hatched portion. However, if writing of the upper half of the frame 2 is inhibited, although the frame 1 is output over the entire picture at the hatched portion, it is impossible to output the frame 2 at the upper half of a subsequent frame. As stated above, in the case of using a single frame memory, a problem occurs at the time of insertion of frame. In order to solve the above-mentioned problems, in the embodiments of the present invention, a frame memory having a memory capacity for at least more than 1.5 frames (three fields) is used. In the first embodiment, two frame memories each having a memory capacity of one frame are used.

Figure 4:
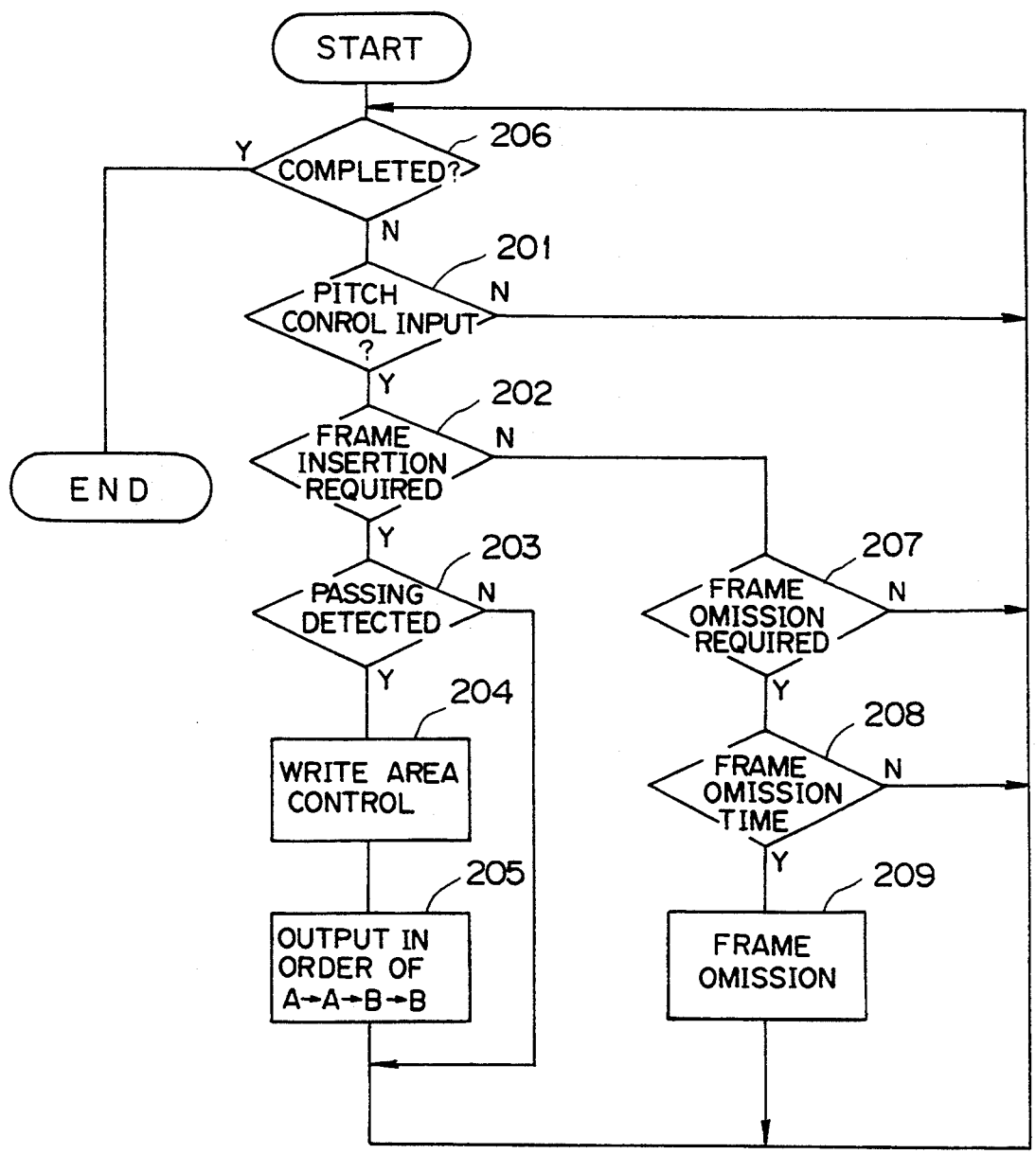
FIG. 4 is a flowchart showing the operation of the first embodiment according to the present invention.

The operation of the first embodiment will now be described with reference to FIGS. 2 to 4. FIG. 4 is a flowchart for explaining the operation of the first embodiment.

The system controller 10 monitors whether or not a pitch control command instructing a speed control performance is given to the input unit 15 in step 201. If the pitch control command is given, the system controller 10 discriminates whether it is required to insert a frame image in step 202. If the write clock is slower than the read clock, the discrimination in step 202 results in YES. If the discrimination in step 202 results in YES, the system controller discriminates whether or not the passing is detected in step 203. If the passing is detected in step 203, the system controller 10 reads out, from the LVD disk 50, image signal of a frame to be inserted (hereinafter referred to as a "frame X" which is assumed to be comprised of a first field A and a second field B) and stores it into both of the frame memories 21 and 22 in the VRAM 8 by the memory control unit 11 in step 204. Then, if the time to insert the frame arrives, the system controller 10 reads out the image signal of the frame X from the field memories 23 and 24 by the memory control unit 11, in the order of the first field A, the first field A, the second field B, and the second field B to output it as a video signal in step 205. Subsequently, the next frame image signal is read from the field memories 25 and 26. Then, it is discriminated that the process is completed or not in step 206.

On the other hand, if the discrimination in step 202 results in NO, the system controller 10 discriminates whether or not a pitch control processing for which frame omission is required in step 207. If the write clock is faster than the read clock, the discrimination results in YES. If it is discriminated that the frame omission is required in step 207, the operation shifts to step 208 in which it is discriminated that whether or not the time to frame omission arrives. If the discrimination in step 208 results in YES, the system controller 10 omits an image signal of a next frame (i.e., frame (X+1)) and reads out the subsequent frame (i.e., frame (X+2)) from the VRAM 8 to output it as a video signal in step 209. Then, the process proceeds to step 206.

The above-mentioned operation will now be described in more detail with reference to FIGS. 2 to 6.

In the case where no passing is detected, the changeover switch $SW_1$ is closed, and the changeover switch $SW_3$ is connected to the frame memory 21 side ($T_3$ side). After a counter 31 of the passing detection circuit in FIG. 6 (which will be described later) is reset on receiving the read V.reset pulse, the counter counts up the read H.reset pulses until the write V.reset pulse comes to latch that value. The latched value is compared with a predetermined value. That is, the counter 31 is reset at the point r of FIG. 14 and latch the number of the read H.reset pulses counted by the point s of FIG. 14. Because one frame signal has 525H, when the count value becomes more than 473 (=525−52), passing is detected and the changeover switch $SW_1$ is opened from the point s of FIG. 14. In FIG. 14, since $\Delta$ is equal to 26, the value is larger than 473 (=525−52). Therefore, the changeover switch $SW_1$ is opened.

Figure 5:
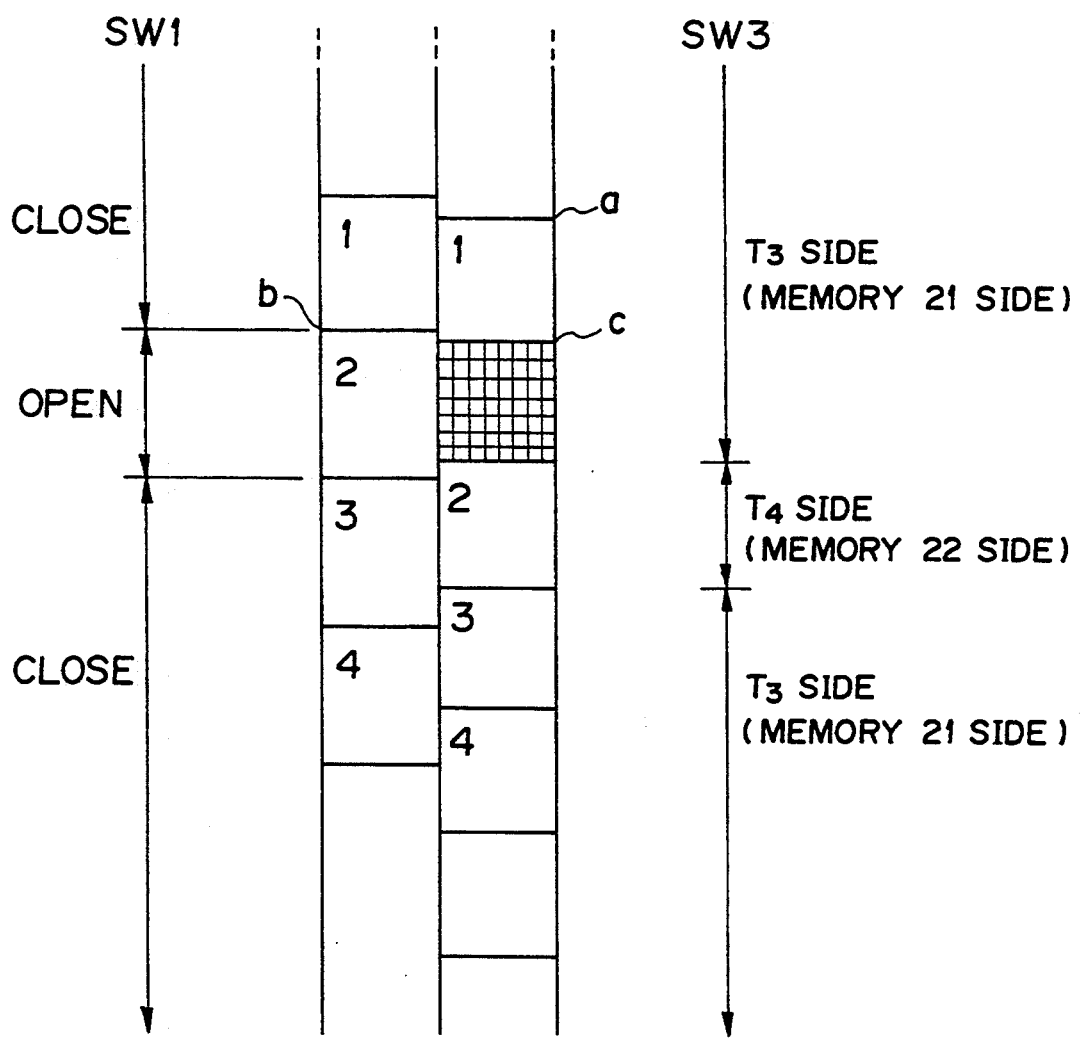
FIG. 5 is an explanatory view showing the operation of the first embodiment according to the present invention.

The above-mentioned state is shown in FIG. 5. A value latched at the point b of FIG. 5 is judged, and the changeover switch $SW_1$ is opened for a time period of one frame. After the changeover switch $SW_1$ is opened, only the data of one frame left in the frame memory 21 is read out (double hatched portions of FIG. 5) and then the changeover switch $SW_3$ is connected to the frame memory 22 side. After the subsequent one frame is read from the memory 22, the changeover switch $SW_3$ is connected to the frame memory 21 side.

By using two frames as stated above, insertion of one frame can be made. Thus, inconvenience as in the hatched portion of FIG. 14 is eliminated.

Figure 6:
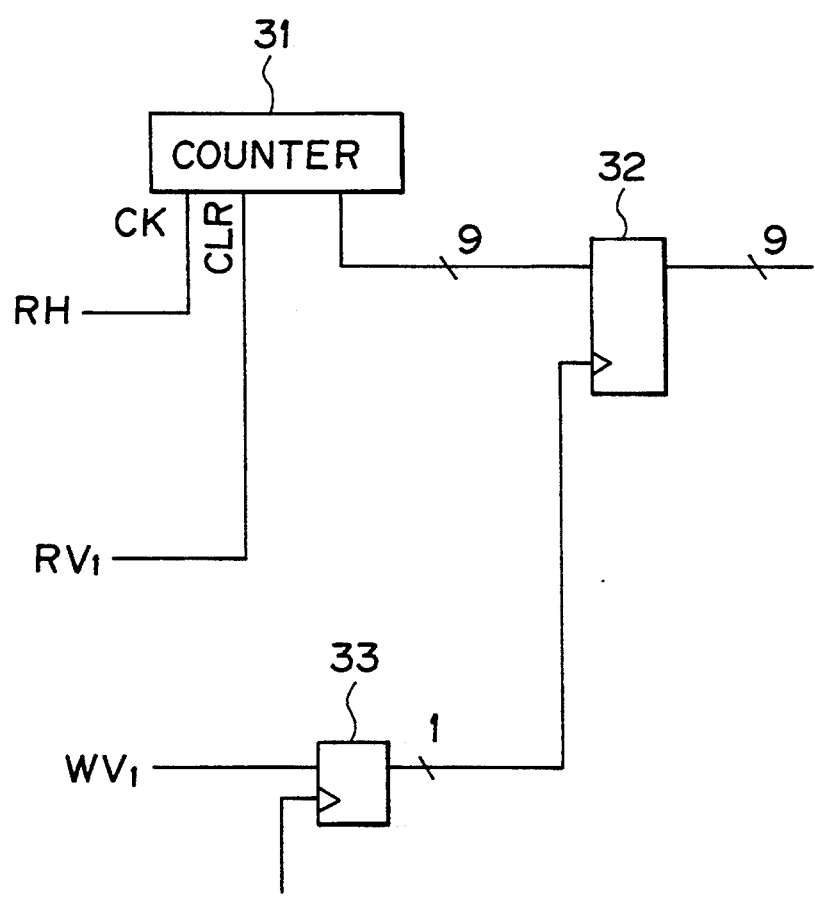
FIG. 6 is a diagram showing a passing detection circuit of the present invention.

FIG. 6 is a block diagram showing a passing detection circuit. Namely, as shown in FIG. 6, the counter 31 is cleared by the read V.reset pulse $RV_1$ to count up by the read H.reset pulse RH. That count value is latched at the timing of the write V.reset pulse $WV_1$ normalized by the read clock. Judgment is made in dependency upon whether the latched value is larger or smaller than a predetermined value. It may be possible to count up by the read H.reset pulse RH from the write V.reset pulse until the read V.reset pulse. In such a case, the predetermined value should be changed by subtracting it from 525 which is the number of the fields in a frame image signal.

Figure 7:
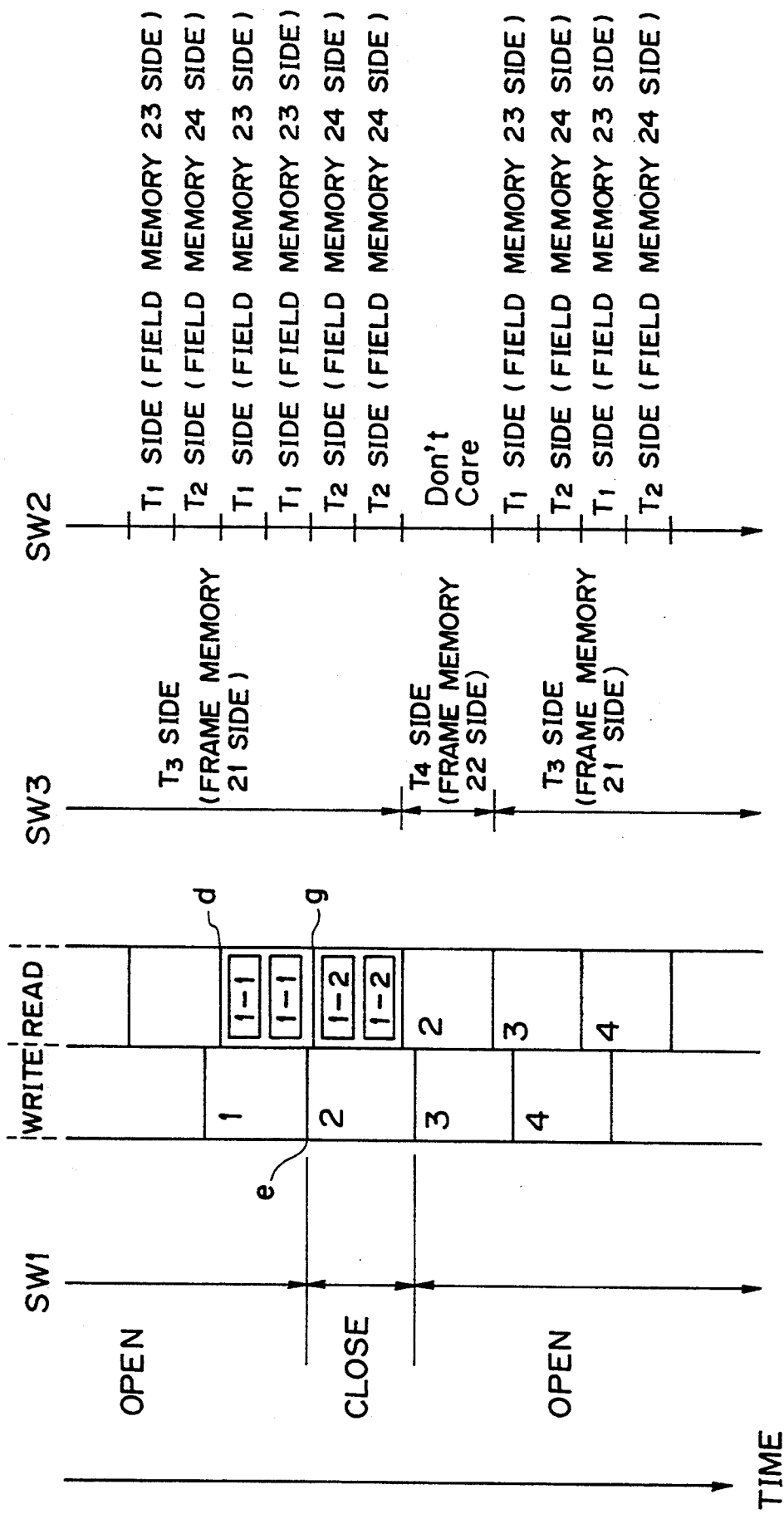
FIG. 7 is an explanatory view showing further detailed operation of the first embodiment according to the present invention.

FIG. 7 shows in more detail the operation of the first embodiment of FIG. 5. As compared to the configuration of FIG. 11, a changeover switch $SW_2$ is added to the circuit of the first embodiment shown in FIG. 3. Thus, there is provided a configuration capable of desirably reading out the contents of field memories 23, 24 in the frame memory 21. In FIG. 7, for a time period of 2 frames from the point d, the content of the field memory 23 (the first field of the first frame) is output twice in succession, and then the content of the field memory 24 (second field of the first frame) is output twice in succession.

Second embodiment

A second embodiment of the present invention will now be described with reference to FIGS. 8 to 10.

Figure 8:
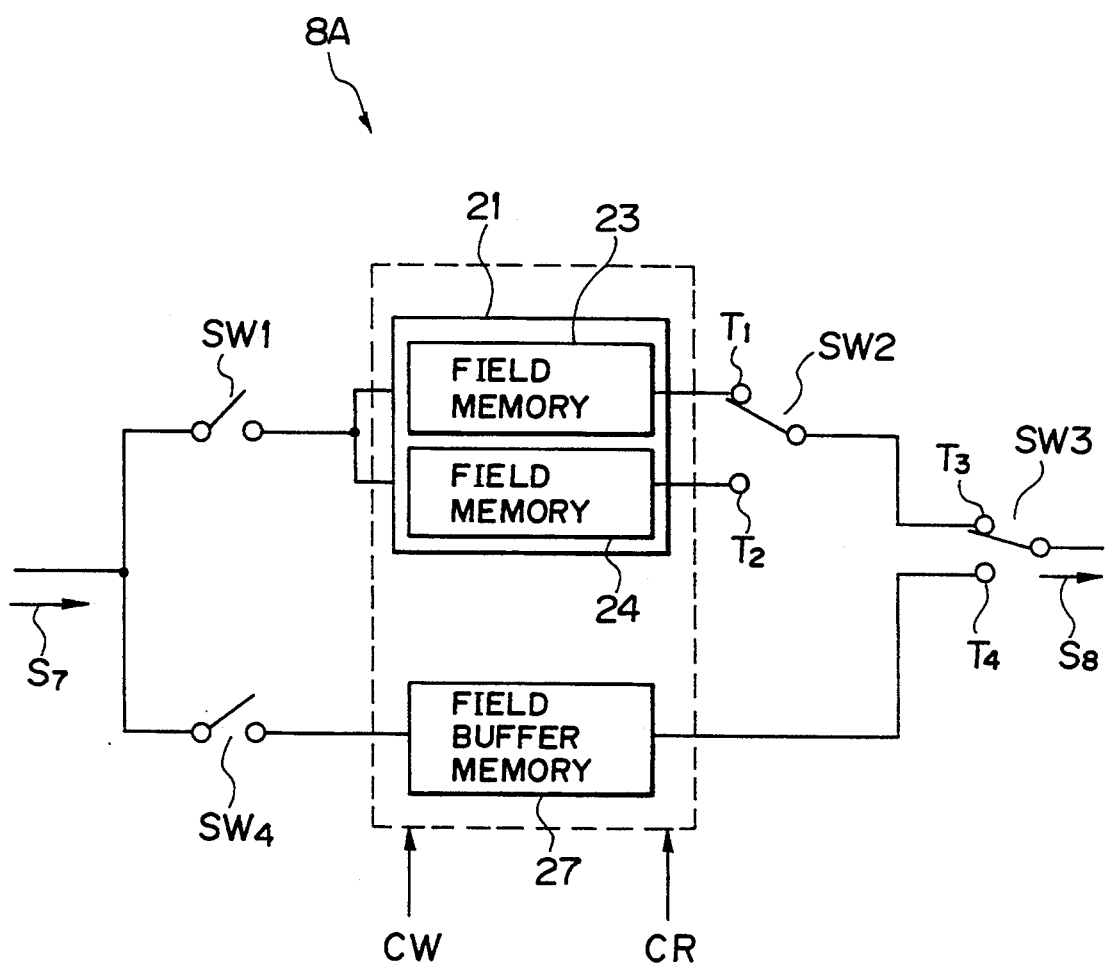
FIG. 8 is a circuit diagram showing the detailed configuration of a VRAM in a second embodiment of the present invention.

FIG. 8 shows the configuration of a VRAM of the second embodiment. The configuration of the entirety of the LVD musical accompaniment playing apparatus is similar to that in the case of the first embodiment. As shown in FIG. 8, the VRAM 8 includes a frame memory 21, a field buffer memory 27, and changeover switches $SW_1$, $SW_2$, $SW_3$ and $SW_4$. The field buffer memory 27 can store video signal of one field. The second embodiment differs from the first embodiment shown in FIG. 3 in that the memory capacity is reduced from two frames to the 1.5 frames (3 fields), and that a changeover switch $SW_4$ is newly added.

The operation of the second embodiment will now be described with reference to FIGS. 9 and 10. FIG. 9 shows the case where passing occurs at the point j, and FIG. 10 shows the case where passing occurs at the point p. The function of the field buffer memory 27 varies in dependency upon where the passing occurs.

Figure 9:
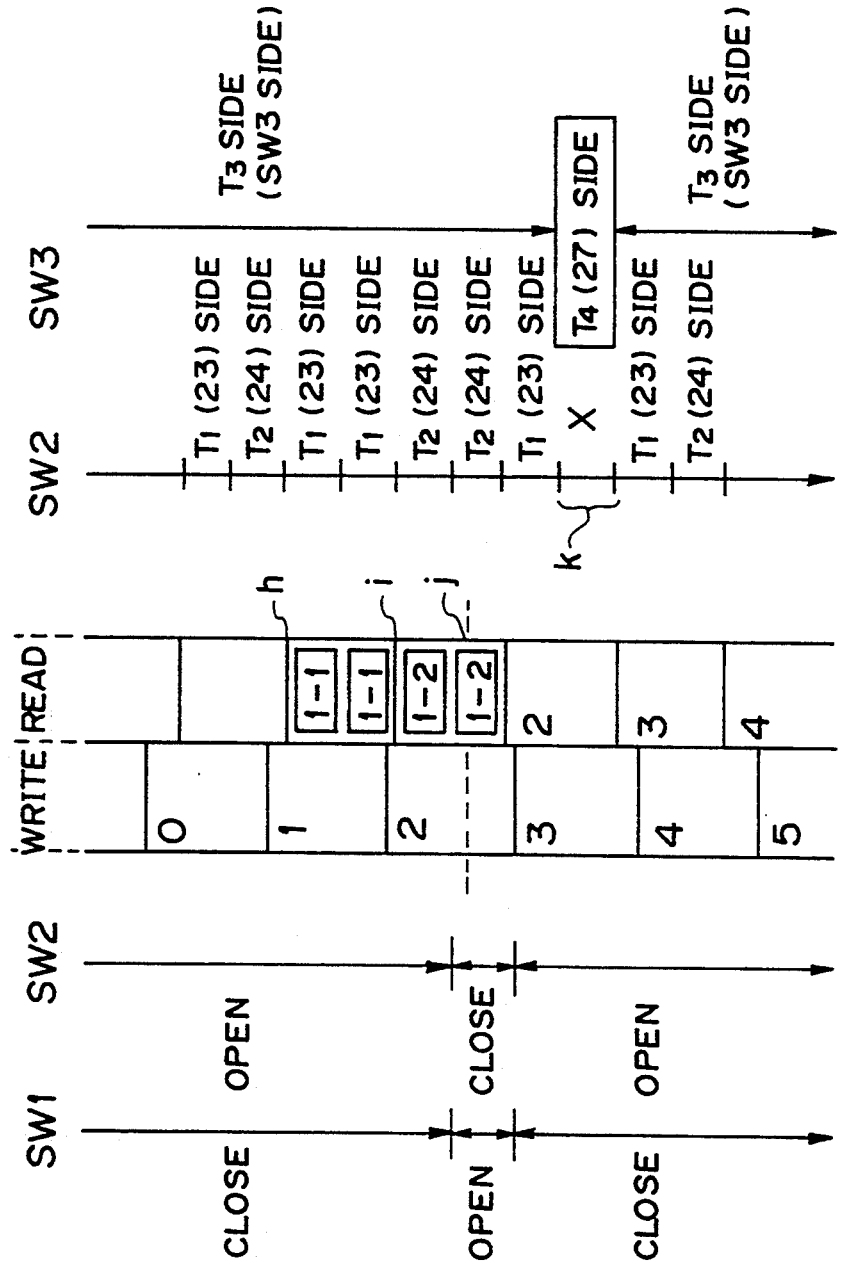
FIGS. 9 and 10 are explanatory views showing the operation of the second embodiment according to the present invention.

Namely, in the case where passing occurs in the second field as shown in FIG. 9, the image of the second field on which passing occurs is written into the field buffer memory 27. Then, the signal of the field written in the buffer memory is read out at the time of period k of FIG. 9.

Figure 10:
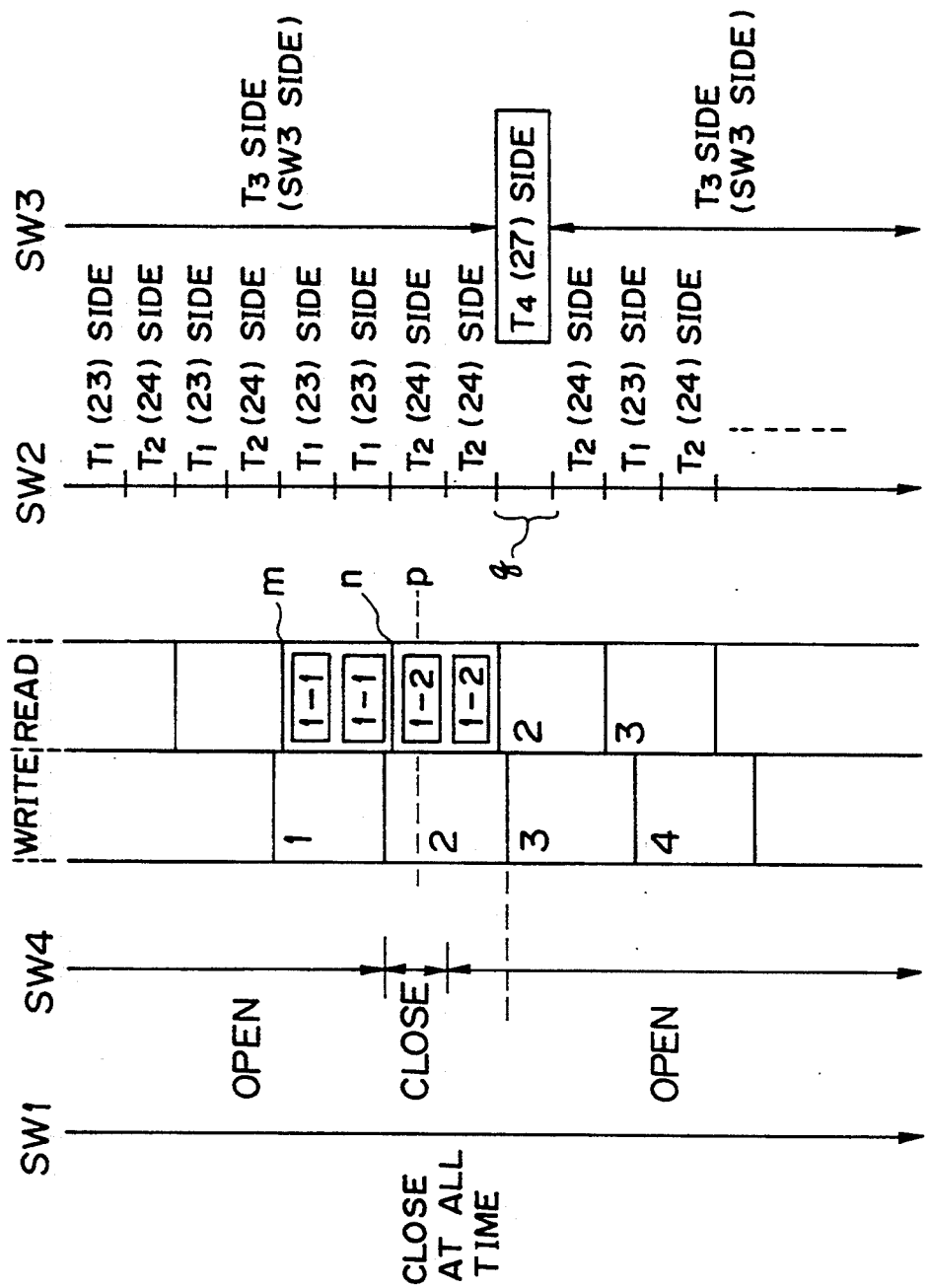

Further, in the case where passing occurs in the first field as shown in FIG. 10, the image of the first field is written into the field buffer memory 27. and the written image is read out at the time of period q of FIG. 10.

When VRAM used in the reproducing speed controller for an image information reproducing apparatus is constructed as above, the effect equivalent to that of the first embodiment can be obtained by a memory having a memory capacity of 1.5 frames (3 fields).

According to the present invention thus constructed, when a speed control command for making the reproducing speed of image information to be low is input, the control unit temporarily stores, into the memories, reproduced image signal at a time when the passing occurs. The passing occurs according to a difference between the speed of write reference signal and the read reference signal. Then, the control unit carries out a control of reproducing image of the first field twice in succession. Then, the control unit carries out a control of reproducing image of the second field twice in succession. Accordingly, display of image at the time of passing is conducted in the order of the first field, first field, the Second field, and the second field of the insertion frame, resulting no reversal of field images in time. Thus, a picture easy to see, which is free from fluctuation is provided. Namely, this reproducing speed controller for an image information reproducing apparatus can advantageously control the reproducing speed of an image without deterioration of the reproduced image.

The invention may be embodied in other specific forms without departing from the spirit or essential characteristics thereof. The present embodiments are therefore to be considered in all aspects as illustrative and not restrictive, the scope of the invention being indicated by the appended claims rather than by the foregoing description and all changes which come within the meaning and range of equivalency of the claims are therefore intended to be embraced therein.

What is claimed is:

1. A reproduction speed controller for controlling reproduction speed of a video signal having first field image signals and second field image signals, comprising:

main memory having a storage capacity of two field image signal;

sub memory having a storage capacity of at least one field image signal;

write means for writing said video signal first field image signal and second field image signal into said main memory and said sub memory in synchronism with a write reference signal which corresponds to a frequency of said video signal;

read means for selectively read out the written video signal from said main memory and said sub memory in synchronism with a read reference signal having a fixed frequency;

passing detection means for generating a passing detection signal on the basis of the frequency difference between said write reference signal and said read reference signal when the frequency of the write reference signal is lower than the frequency of the read reference signal; and control means for controlling said write means and said read means in response to said passing detection signal, wherein said control means permits said read means to successively read out the first field image signal twice and subsequently permits said read means to successively read out the second field image.

2. A reproduction speed controller according to claim 1, wherein said read means reads out the first field image successively twice and the second field image successively twice from said main memory.

3. A reproduction speed controller according to claim 2, wherein said read means reads out the first field image and the second field image once from said sub memory after said successive reading of the first field image twice and the second field image twice from said main memory.

4. A reproduction speed controller according to claim 2, wherein said read means reads out the first field image once from said main memory and reads out the second field image once from said sub memory after said successive reading of the first field image twice and the second field image twice from said main memory.

5. A reproduction speed controller according to claim 2, wherein said read means reads out the first field image from said sub memory after said successive reading of the first field image twice and the second field image twice from said main memory.

6. A reproduction speed controller according to claim 1, wherein said control means permits said write means to write the input video signal which is to be written immediately after the receipt of said passing detection signal into both of said main memory and said sub memory.

7. A reproduction speed controller according to claim 1, wherein said passing detection means counts a time difference between the receipt of the write reference signal and the read reference signal, and generates the passing detection signal when said time difference exceeds a definite value determined in accordance with a frequency difference between said write reference signal and the read reference signal.

8. A reproduction speed controller according to claim 1, further comprising an input means for inputting a speed control command for varying the frequency of said input video signal.

9. A method for controlling reproduction speed of a video signal having first field image signal and second field image signal, comprising the steps of:

writing said video signal first field image signal and second field image signal into memory in synchronism with a write reference signal which corresponds to a frequency of said video signal;

reading out the first field image signal and the second field image signal alternately from said memory in synchronism with a read reference signal having a fixed frequency;

detecting a passing of the read reference signal over the write reference signal on the basis of the frequency difference between said write reference signal and said read reference signal when the frequency of the write reference signal is lower than the frequency of the read reference signal; and successively reading out the first field image signal twice and then successively reading out the second field image twice when said passing is detected.

* * * * *